(12) United States Patent
Yamaguchi et al.

(10) Patent No.: US 12,291,792 B2
(45) Date of Patent: May 6, 2025

(54) ELECTROLYZED WATER GENERATOR

(71) Applicant: PANASONIC INTELLECTUAL PROPERTY MANAGEMENT CO., LTD., Osaka (JP)

(72) Inventors: Tomohiro Yamaguchi, Shiga (JP); Kenichiro Inagaki, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 162 days.

(21) Appl. No.: 18/111,141

(22) Filed: Feb. 17, 2023

(65) Prior Publication Data
US 2023/0212767 A1    Jul. 6, 2023

Related U.S. Application Data

(63) Continuation of application No. 16/509,381, filed on Jul. 11, 2019, now Pat. No. 11,613,821.

(30) Foreign Application Priority Data

Jul. 13, 2018   (JP) .................. 2018-133652
Jul. 13, 2018   (JP) .................. 2018-133654
Jul. 13, 2018   (JP) .................. 2018-133656

(51) Int. Cl.
*C25B 15/08*     (2006.01)
*C02F 1/461*     (2023.01)
(Continued)

(52) U.S. Cl.
CPC .......... *C25B 15/08* (2013.01); *C02F 1/46104* (2013.01); *C25B 1/13* (2013.01);
(Continued)

(58) Field of Classification Search
CPC .. C25B 1/04; C25B 15/08; C25B 1/13; C25B 9/63; C25B 9/65; C02F 1/46104;
(Continued)

(56) References Cited

U.S. PATENT DOCUMENTS 3,835,020 A   9/1974   Galneder
4,617,101 A   10/1986  Sato et al.
(Continued)

FOREIGN PATENT DOCUMENTS

CN   202401350 U   8/2012
CN   106365260 A   2/2017
(Continued)

OTHER PUBLICATIONS

International Search Report of PCT application No. PCT/JP2019/027432 dated Oct. 8, 2019.
(Continued)

*Primary Examiner* — Ciel P Contreras
(74) *Attorney, Agent, or Firm* — Rimon P.C.

(57) ABSTRACT

An electrolyzed water generator includes an anode, a cathode, a cation exchange membrane, a housing having a first through-hole and a second through-hole, a first feeder shaft, and a second feeder shaft. Each of the first feeder shaft and the second feeder shaft has an engaging portion. Each of the first through-hole and the second through-hole has an engaged portion. The engaging portion and the engaged portion are engaged with each other to inhibit a positional shift of the first feeder shaft against the first through-hole in the given direction and to inhibit a positional shift of the second feeder shaft against the second through-hole in the given direction.

10 Claims, 7 Drawing Sheets

(51) Int. Cl.
   *C25B 1/13* (2006.01)
   *C25B 9/23* (2021.01)
   *C25B 9/63* (2021.01)
   *C25B 9/65* (2021.01)

(52) U.S. Cl.
   CPC .................. *C25B 9/23* (2021.01); *C25B 9/63* (2021.01); *C25B 9/65* (2021.01); *C02F 2201/46115* (2013.01); *C02F 2201/78* (2013.01)

(58) Field of Classification Search
   CPC ........ C02F 2201/46115; C02F 2201/78; C02F 1/46109; C02F 2001/46152; C02F 1/4672
   See application file for complete search history.

(56) References Cited

U.S. PATENT DOCUMENTS

| | | |
|---|---|---|
| 2004/0188245 A1 | 9/2004 | Katayama et al. |
| 2009/0101519 A1 | 4/2009 | Szalay et al. |
| 2012/0121966 A1 | 5/2012 | Kim |
| 2012/0199484 A1* | 8/2012 | Liang .................. B01D 61/463 204/535 |
| 2014/0038022 A1 | 2/2014 | Suzuki |
| 2014/0332157 A1* | 11/2014 | Arai .................. B29C 66/30322 156/272.8 |
| 2017/0092962 A1 | 3/2017 | Van Boeyen |
| 2017/0174539 A1 | 6/2017 | Inagaki et al. |
| 2017/0369339 A1* | 12/2017 | Umimoto .................. A61L 2/00 |
| 2019/0055144 A1 | 2/2019 | Inagaki et al. |
| 2019/0326622 A1 | 10/2019 | Brodmann et al. |

FOREIGN PATENT DOCUMENTS

| | | | | |
|---|---|---|---|---|
| JP | 57-085981 A | 5/1982 | | |
| JP | 2004-300543 A | 10/2004 | | |
| JP | 2005-161196 A | 6/2005 | | |
| JP | 2005-313153 A | 11/2005 | | |
| JP | 2008-189968 A | 8/2008 | | |
| JP | 2014-100648 A | 6/2014 | | |
| JP | 2016-064383 A | 4/2016 | | |
| JP | 2017-018853 A | 1/2017 | | |
| JP | 2017-070895 A | 4/2017 | | |
| JP | 2017-176993 A | 10/2017 | | |
| KR | 10-2012-047327 A | 5/2012 | | |
| KR | 20140033762 A | * | 3/2014 | ............. C02F 1/467 |
| KR | 10-2018-024980 A | 3/2018 | | |
| KR | 101860100 B1 | * | 6/2018 | ............. C02F 1/461 |
| WO | 2012/144444 A1 | 10/2012 | | |
| WO | 2017/168475 A1 | 10/2017 | | |

OTHER PUBLICATIONS

The Extended European Search Report dated Jul. 26, 2021 for the related European Patent Application No. 19834025.9.
English Translation of Chinese Search Report dated Jun. 1, 2022 for the related Chinese Patent Application No. 201980040390.6.
Non-Final Office Action dated Aug. 2, 2022 issued in U.S. Appl. No. 16/509,381.
Final Office Action dated Apr. 11, 2022 issued in U.S. Appl. No. 16/509,381.
Non-Final Office Action dated Nov. 12, 2021 issued in U.S. Appl. No. 16/509,381.
Notice of Allowance dated Dec. 6, 2022 issued in U.S. Appl. No. 16/509,381.

* cited by examiner

ELECTROLYZED WATER GENERATOR

CROSS-REFERENCE OF RELATED APPLICATIONS

This application is a Continuation of U.S. patent application Ser. No. 16/509,381, filed on Jul. 11, 2019, which claims the benefit of Japanese Patent Application No. 2018-133652, filed on Jul. 13, 2018, Japanese Patent Application No. 2018-133654, filed on Jul. 13, 2018, and Japanese Patent Application No. 2018-133656, filed on Jul. 13, 2018, and the entire disclosures of which Applications are incorporated by reference herein.

BACKGROUND

1. Technical Field

The present disclosure relates to an electrolyzed water generator.

2. Description of the Related Art

An electrolyzed water generator that receives raw water and generates electrolyzed water, such as ozonized water, is proposed in Unexamined Japanese Patent Publication No. 2017-176993. The electrolyzed water generator includes an anode, a cathode, and a cation exchange membrane provided between the anode and the cathode. The electrolyzed water generator also includes a housing having an inlet into which water flows and an outlet from which water flows out, the housing enclosing the anode, the cathode, and the cation exchange membrane. The electrolyzed water generator further includes two feeder shafts electrically connected to the anode and the cathode, respectively, the feeder shafts extending in a given direction to penetrate two through-holes of the housing, respectively.

SUMMARY

The conventional electrolyzed water generator has an anode, a cathode, and a cation exchange membrane arranged into a proper positional relationship, thus being able to generate electrolyzed water in a preferable manner. However, a shift of the positional relationship between the anode, the cathode, and the cation exchange membrane may lead to deterioration of electrolyzed water generation performance. It is therefore required that the proper positional relationship between the anode, the cathode, and the cation exchange membrane be maintained.

The present disclosure has been made in view of the above problem of such a conventional technique. An object of the present disclosure is to provide an electrolyzed water generator that reduces a possibility of a positional shift between the anode, the cathode, and the cation exchange membrane.

An electrolyzed water generator according to the present disclosure includes an anode; a cathode; a cation exchange membrane provided between the anode and the cathode; a housing having an inlet into which water flows and an outlet from which water flows out, the housing enclosing the anode, the cathode, and the cation exchange membrane and having a first through-hole and a second through-hole; a first feeder shaft electrically connected to the anode, the first feeder shaft extending in a given direction to penetrate the first through-hole; and a second feeder shaft electrically connected to the cathode, the second feeder shaft extending in the given direction to penetrate the second through-hole. Each of the first feeder shaft and the second feeder shaft has an engaging portion. Each of the first through-hole and the second through-hole has an engaged portion. The engaging portion and the engaged portion are engaged with each other to inhibit a positional shift of the first feeder shaft against the first through-hole in the given direction and to inhibit a positional shift of the second feeder shaft against the second through-hole in the given direction.

An electrolyzed water generator according to the present disclosure includes an anode; a cathode; a cation exchange membrane provided between the anode and the cathode; a housing having an inlet into which water flows and an outlet from which water flows out, the housing enclosing the anode, the cathode, and the cation exchange membrane and having a first through-hole and a second through-hole; a first feeder shaft electrically connected to the anode, the first feeder shaft extending in a given direction to penetrate the first through-hole; and a second feeder shaft electrically connected to the cathode, the second feeder shaft extending in the given direction to penetrate the second through-hole. Each of the first feeder shaft and the second feeder shaft has a fitting portion. Each of the first through-hole and the second through-hole has a fitted portion. The fitting portion and the fitted portion are fitted together to inhibit rotation of the first feeder shaft with respect to the first through-hole around a rotation axis along the given direction and to inhibit rotation of the second feeder shaft with respect to the second through-hole around a rotation axis along the given direction.

An electrolyzed water generator according to the present disclosure includes an anode; a cathode; a cation exchange membrane provided between the anode and the cathode; a housing having an inlet into which water flows and an outlet from which water flows out, the housing enclosing the anode, the cathode, and the cation exchange membrane and having a first through-hole and a second through-hole; a first feeder shaft electrically connected to the anode, the first feeder shaft extending in a given direction to penetrate the first through-hole; a second feeder shaft electrically connected to the cathode, the second feeder shaft extending in the given direction to penetrate the second through-hole; a first spring connecting the anode to the first feeder shaft; and a second spring connecting the cathode to the second feeder shaft.

An electrolyzed water generator according to the present disclosure includes an anode; a cathode; a cation exchange membrane provided between the anode and the cathode; and a housing having an inlet into which water flows and an outlet from which water flows out, the housing enclosing the anode, the cathode, and the cation exchange membrane. The housing includes a positioning fitting portion fitted on an external fitted portion.

An electrolyzed water generator according to the present disclosure includes an anode; a cathode; a cation exchange membrane provided between the anode and the cathode; and a housing having an inlet into which water flows and an outlet from which water flows out, the housing enclosing the anode, the cathode, and the cation exchange membrane. The housing includes a container that holds the anode, the cathode, and the cation exchange membrane, and a lid that closes an opening of the container. The lid includes a laser-transmitting resin having a color that relatively easily allows transmission of laser light. The container includes a laser-absorbing resin having a color that relatively easily allows absorption of laser light. The lid and the container are fixed together by welding their resin components by laser light.

An electrolyzed water generator according to the present disclosure includes an anode; a cathode; a cation exchange membrane provided between the anode and the cathode; and a housing having an inlet into which water flows and an outlet from which water flows out, the housing enclosing the anode, the cathode, and the cation exchange membrane. The housing includes a container that holds the anode, the cathode, and the cation exchange membrane, and a lid that closes an opening of the container. The anode, the cation exchange membrane, and the cathode jointly make up a stacked structure. The lid includes a holding projection formed on an interior of the lid in such a way as to hold down the stacked structure in a stacking direction.

An electrolyzed water generator according to the present disclosure includes an anode; a cathode; a cation exchange membrane provided between the anode and the cathode; and a housing having an inlet into which water flows and an outlet from which water flows out, the housing enclosing the anode, the cathode, and the cation exchange membrane. The housing includes a container that holds the anode, the cathode, and the cation exchange membrane, and a lid that closes an opening of the container. The electrolyzed water generator further includes an elastic material placed between a bottom of the container and the anode, the cathode, and the cation exchange membrane. The lid is configured to hold down the anode, the cathode, and the cation exchange membrane toward the elastic material. The elastic material includes a hollow that inhibits deformation of the elastic material toward a side wall of the container.

An electrolyzed water generator according to the present disclosure includes an anode; a cathode; a cation exchange membrane provided between the anode and the cathode; and a housing having an inlet into which water flows and an outlet from which water flows out, the housing enclosing the anode, the cathode, and the cation exchange membrane. The housing includes a container that holds the anode, the cathode, and the cation exchange membrane, and a lid that closes an opening of the container. The electrolyzed water generator further includes an elastic material placed between a bottom of the container and the anode, the cathode, and the cation exchange membrane. The container includes an arcuate corner that connects the bottom of the container to an inner side surface of the container to make the bottom and inner side surface continuous with each other. The elastic material includes an arcuate chamfered portion that connects a lower surface of the elastic material to a side surface of the elastic material to make the lower surface and side surface continuous with each other, and that is stuck closely to the arcuate corner. The container includes a container fitted portion formed on an inner side surface of the container. The elastic material includes an elastic material fitting portion formed on a side face of the elastic material, the elastic material fitting portion being fitted into the container fitted portion. The elastic material fitting portion and the container fitted portion make up a structure that prevents the elastic material with front and rear sides inverted in a direction of stacking of the anode, the cation exchange membrane, and the cathode from being inserted into the housing.

According to the electrolyzed water generator of the present disclosure, a positional shift between the anode, the cathode, and the cation exchange membrane in the given direction in which the feeder shafts extend is inhibited.

According to the electrolyzed water generator of the present disclosure, a positional shift between the anode, the cathode, and the cation exchange membrane in the direction of rotation around the rotation axis along the given direction in which the feeder shafts extend is inhibited.

According to the electrolyzed water generator of the present disclosure, even if a load is applied to the feeder shaft, the spring absorbs a positional shift of the feeder shaft that is caused by the load. As a result, an adverse effect that the positional shift exerts on at least either the anode or the cathode is suppressed.

According to the electrolyzed water generator of the present disclosure, the electrolyzed water generator can be used more preferably.

According to the electrolyzed water generator of the present disclosure, the lid and the container can be fixed easily.

According to the electrolyzed water generator of the present disclosure, a positional shift between the anode, the cation exchange membrane, and the cathode that make up the stacked structure is inhibited.

According to the electrolyzed water generator of the present disclosure, an adverse effect that deformation of the elastic material exerts on the container is suppressed.

According to the electrolyzed water generator of the present disclosure, inserting the elastic material with its front and rear sides inverted in the direction of stacking of the cathode, the anode, and the cation exchange membrane into the housing is easily prevented.

DETAILED DESCRIPTION

Figure 1:
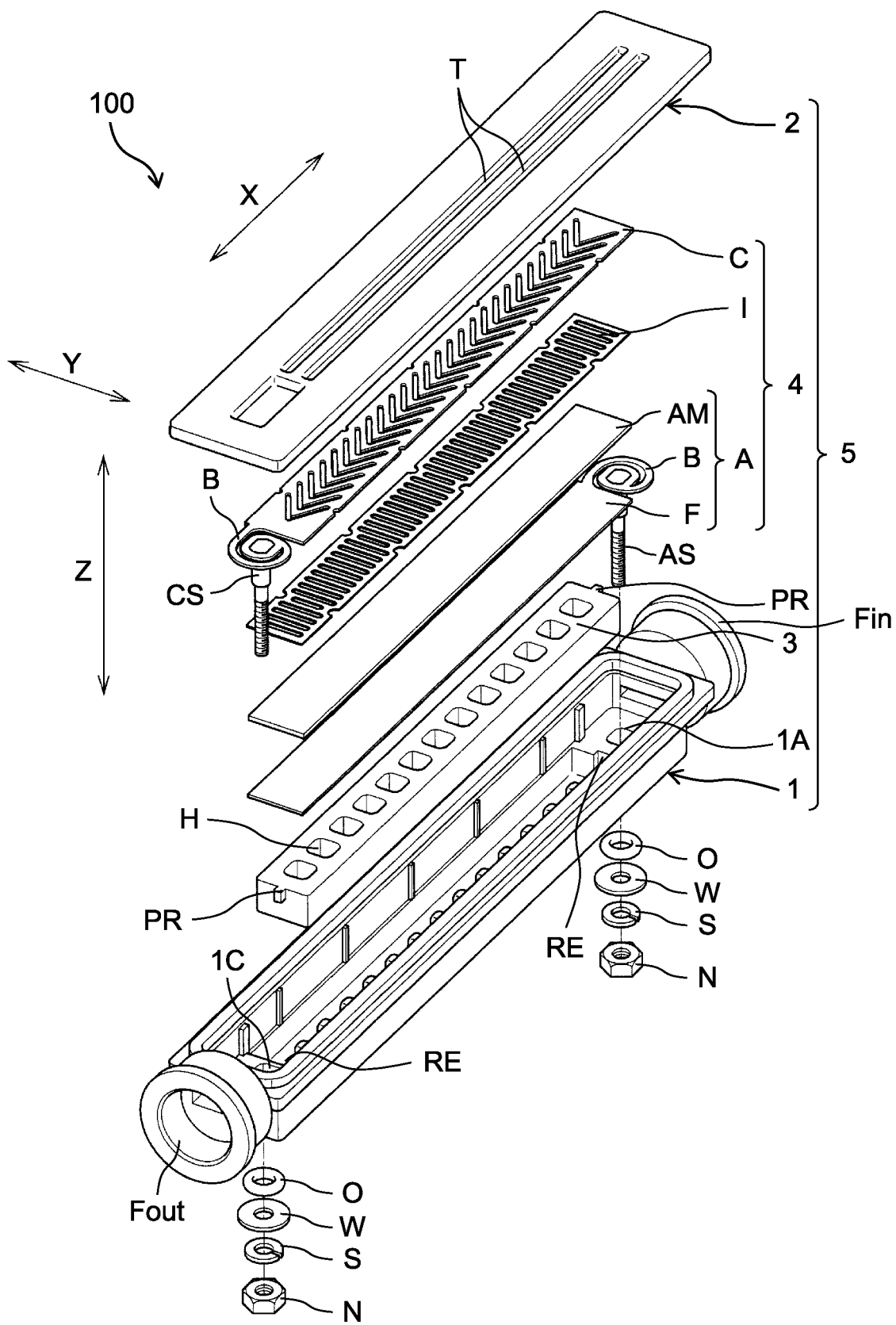
FIG. 1 is an exploded perspective view of an electrolyzed water generator according to an exemplary embodiment.

An electrolyzed water generating system and an electrolyzed water generator used in the electrolyzed water generating system according to exemplary embodiments will now be described with reference to drawings. In the exemplary embodiments to be described below, unless specified otherwise, components denoted by the same reference marks have the same functions even if the shapes of the components depicted in the drawings are slightly different from each other.

According to an exemplary embodiment, electrolyzed water generator 100 is an ozonized water generator that generates ozonized water as electrolyzed water. Ozonized water, which is effective for sterilization and organic material decomposition, is used in fields of water processing, food, and medical. Ozonized water has advantages of a low residual effect and no creation of byproduct.

In this specification, an X direction shown in FIG. 1 is a direction along a water channel and is referred to as a waterflow direction. As shown in FIG. 1, electrolyzed water generator 100 has a rectangular parallelpipedic shape whose lengthwise direction matches the X direction. A Y direction shown in FIG. 1 is a direction intersecting the water channel and is referred to as a width direction. The Y direction is a direction along a horizontal plane. A Z direction shown in FIG. 1 is a direction in which feeder F, anode A, cation exchange membrane I, and cathode C are stacked, and is therefore referred to as a stacking direction. In FIG. 1, in a state where lid 2 of electrolyzed water generator 100 is located on the upper side, the vertical direction (perpendicular direction) is indicated as the Z direction. A combination of the X direction, the Y direction, and the Z direction is not limited to the combination shown in FIG. 1. This means that electrolyzed water generator 100 may be set in any position.

It is preferable, however, that electrolyzed water generator 100 according to the exemplary embodiment, set in a position in which the water channel extends along the perpendicular direction, be incorporated in another apparatus. More specifically, it is preferable that electrolyzed water generator 100, set in a position in which inlet Fin is directed downward while outlet Fout is directed upward, be incorporated in another apparatus. In other words, it is preferable that electrolyzed water generator 100 be set in a position in which water flows from a lower side toward an upper side. This is because ozone generated on a surface of anode A is preferably separated quickly from the surface of anode A before growing into bubbles of ozone.

Inlet Fin directed downward and outlet Fout directed upward create buoyancy, which causes ozone to quickly leave the surface of anode A. This inhibits ozone from remaining in a bubbled form and allows ozone to dissolve into water easily. Hence efficiency of ozonized water generation is improved. However, electrolyzed water generator 100 in any position other than the position in which water flows along the perpendicular direction may be incorporated in another apparatus.

As shown in FIG. 1, electrolyzed water generator 100 includes anode A composed of feeder F and anode main body AM, cathode C, and cation exchange membrane I disposed between anode A and cathode C. In this exemplary embodiment, anode A is formed of feeder F and anode main body AM. However, anode A may be formed of a single material. Anode A may also be formed of three or more materials.

Feeder F, anode main body AM, cation exchange membrane I, and cathode C make up stacked structure 4. Each of feeder F, anode main body AM, cation exchange membrane I, and cathode C has a tabular shape. The tabular shape has a rectangle plane whose lengthwise direction matches the X direction, i.e., the waterflow direction and whose widthwise direction matches the Y direction, i.e., the width direction, and has a thickness in the Z direction, i.e., the stacking direction. Feeder F, anode main body AM, cation exchange membrane I, and cathode C are stacked in this order from the lower side toward the upper side in the Z direction.

Cathode C has V-shaped through-holes in a plan view. Cation exchange membrane I has through-holes extending in a direction intersecting the waterflow direction. Ozone is generated in the through-holes of cathode C and in the through-holes of cation exchange membrane I and dissolves into water in container 1. Through this process, ozonized water is generated.

As shown in FIG. 1, electrolyzed water generator 100 according to this exemplary embodiment includes housing 5. Housing 5 has inlet Fin into which water flows and flow outlet Fout from which water flows out, and encloses feeder F, anode A, cathode C, and cation exchange membrane I. Housing 5 includes container 1 that holds feeder F, anode A, cathode C, and cation exchange membrane I, and lid 2 that closes an opening of container 1.

Figure 2:
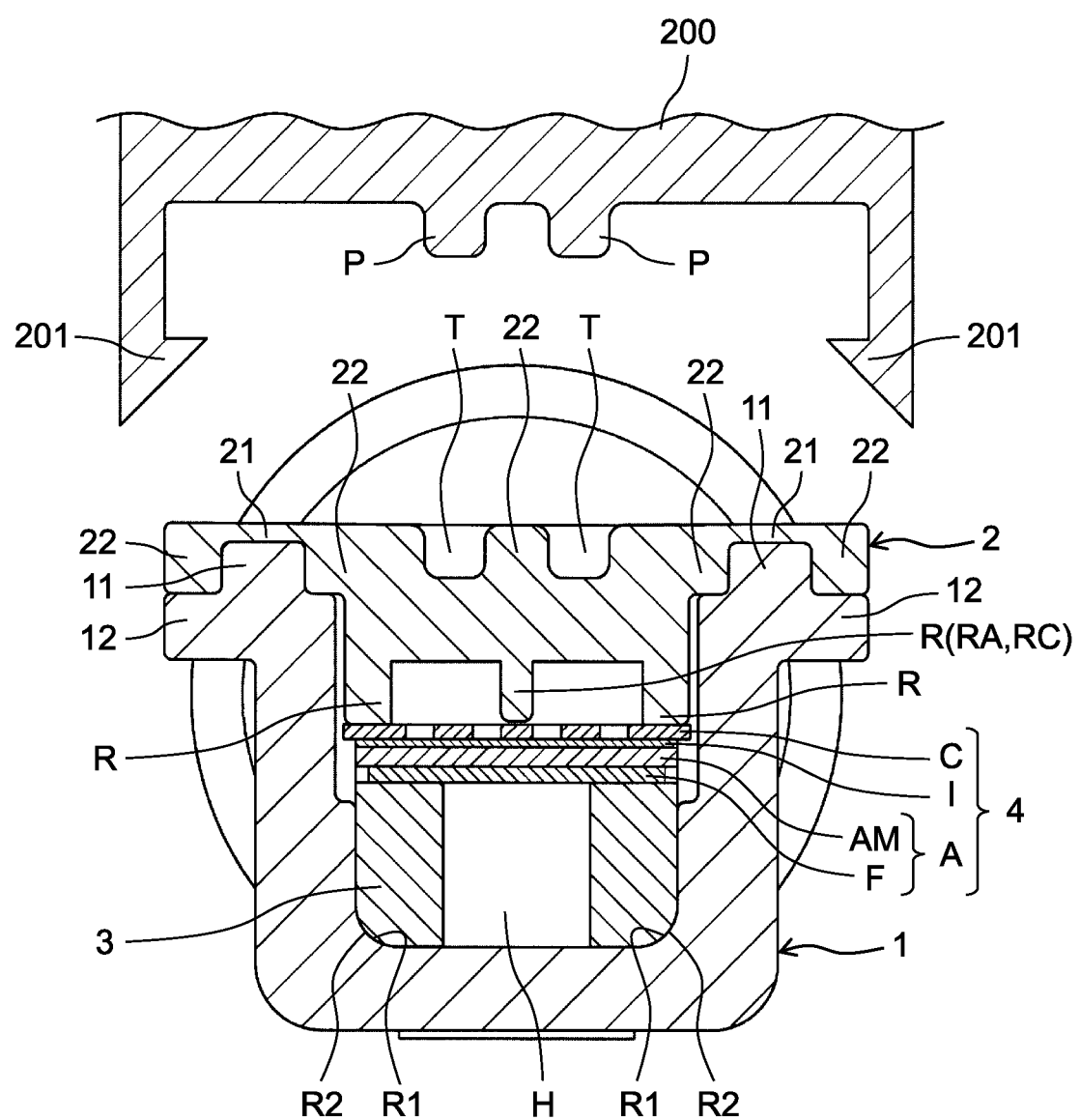
FIG. 2 is a vertical sectional view taken by cutting the electrolyzed water generator according to the exemplary embodiment along its width direction.

As shown in FIGS. 1 and 2, elastic material 3 is placed on a bottom of container 1. On top of elastic material 3, stacked structure 4 is placed. Lid 2 is fixed to an upper surface of container 1 to hold down stacked structure 4.

As shown in FIGS. 1 and 2, housing 5 includes positioning fitting portions T that are fitted on fitted portions P of external apparatus 200. This structure allows electrolyzed water generator 100 to be positioned easily with respect to external apparatus 200. According to this exemplary embodiment, fitted portions P are projections and positioning fitting portions T are recesses. However, fitted portions P may be recesses and positioning fitting portions T may be projections. In other words, positioning fitting portions T and fitted portions P may have any shape as long as the shape allows positioning fitting portions T and fitted portions P to be fitted together.

According to this exemplary embodiment, positioning fitting portions T are plurality of linear grooves extending in the lengthwise direction. However, positioning fitting portions T may have any shape as long as the shape allows positioning fitting portions T to be fitted on fitted portions of an external attachment other than external apparatus 200.

According to this exemplary embodiment, positioning fitting portions T are formed on lid 2. Therefore, container 1 having positioning fitting portions T can be formed while a decrease in the strength of the container 1 caused by positioning fitting portions T is suppressed. However, positioning fitting portions T may be formed on container 1.

External apparatus 200 has claw portions 201 drooping from an outer edge of external apparatus 200. Electrolyzed water generator 100 is inserted between claw portions 201 of external apparatus 200 such that claw portions 201 of external apparatus 200 are hooked on a lower side of a flange 12 extending outward from an upper end of container 1. As a result, electrolyzed water generator 100 is fixed to external apparatus 200. External apparatus 200 is an apparatus that uses electrolyzed water, e.g., ozonized water generated by electrolyzed water generator 100.

Lid 2 includes a thin-walled portion 21 having a relatively small wall thickness and thick-walled portion 22 having a relatively large wall thickness. Positioning fitting portions T are formed on thick-walled portion 22. As a result, a decrease in the strength of lid 2 is suppressed. Positioning fitting portions T are grooves extending along the lengthwise direction of lid 2. Positioning fitting portions T formed in this manner allow electrolyzed water generator 100 to be positioned stably with respect to fitted portions P of external apparatus 200.

Lid 2 includes a laser-transmitting resin having a color that relatively easily allows transmission of laser light.

Container 1 includes a laser-absorbing resin having a color that relatively easily allows absorption of laser light. When electrolyzed water generator 100 is manufactured, laser light is emitted from above lid 2 onto thin-walled portion 21 in the Z direction. Laser light having passed through thin-walled portion 21 heats a lower surface of thin-walled portion 21 of lid 2 and an upper surface of container 1 as well. As a result, according to this exemplary embodiment, thin-walled portion 21 of lid 2 and container 1 are fixed together by laser welding of their resin components. In this manner, lid 2 and container 1 are fixed together easily.

According to this exemplary embodiment, container 1 is colored in black or has a color close to black, and lid 2 is transparent or white or has a color close to transparent or white. In other words, container 1 and lid 2 are different in laser light transparency from each other. Because of this, laser welding can be carried out extremely easily. It should be noted, however, container 1 and lid 2 may have any color as long as the color allows laser welding of their resin components.

Thin-walled portion 21 of lid 2 make up a bottom of a groove formed on lid 2, and container projection 11 formed on flange 12 of container 1 is inserted into the groove. As a result, lid 2 and container 1 are fixed firmly together. In addition, positioning of lid 2 and container 1 and formation of thin-walled portion 21 for laser welding of the resin components are both achieved through a single groove.

As shown in FIG. 1, feeder shaft AS for anode A is electrically connected to feeder F of anode A. Feeder F of anode A and feeder shaft AS for anode A are connected via spring B for anode A. Feeder shaft AS for anode A is inserted in through-hole 1A formed on the bottom of container 1. A part of feeder shaft AS for anode A, the part projecting out of container 1, is electrically connected to a positive electrode of a power supply unit.

As shown in FIG. 1, feeder shaft CS for cathode C is electrically connected to cathode C. Feeder shaft CS for cathode C and cathode C are connected via spring B for cathode C. Feeder shaft CS for cathode C is inserted in through-hole 1C formed on the bottom of container 1. A part of feeder shaft CS for cathode C, the part projecting out of container 1, is electrically connected to a negative electrode of the power supply unit.

The part of feeder shaft AS for anode A, the part projecting out of container 1, and the part of feeder shaft CS for cathode C, the part projecting out of container 1, are inserted into O-rings O, washers W, washers S, and hexagon nuts N, respectively. As a result, when hexagon nuts N are tightened, feeder F, anode A, cation exchange membrane I, and cathode C, which make up stacked structure 4, are held down against the bottom of container 1 and fixed to the bottom of container 1.

Figure 3:
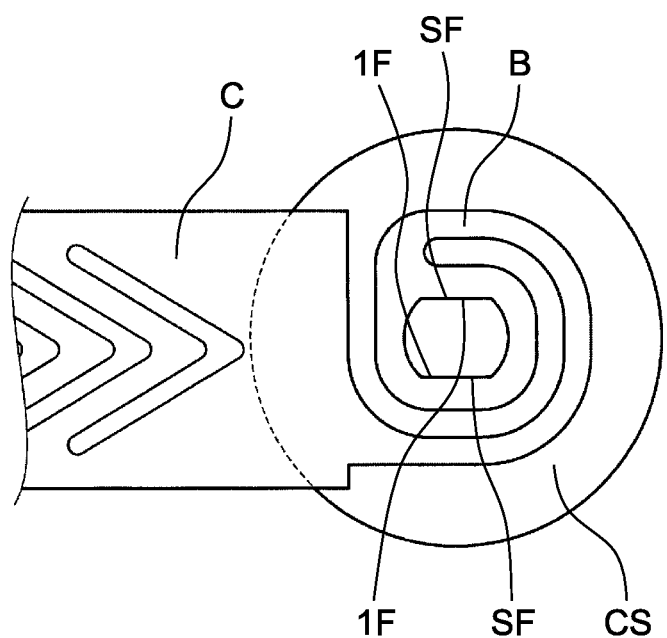
FIG. 3 is a partial plan view showing a positional relationship between a cathode, a spring, and a feeder shaft of the electrolyzed water generator according to the exemplary embodiment.
Figure 4:
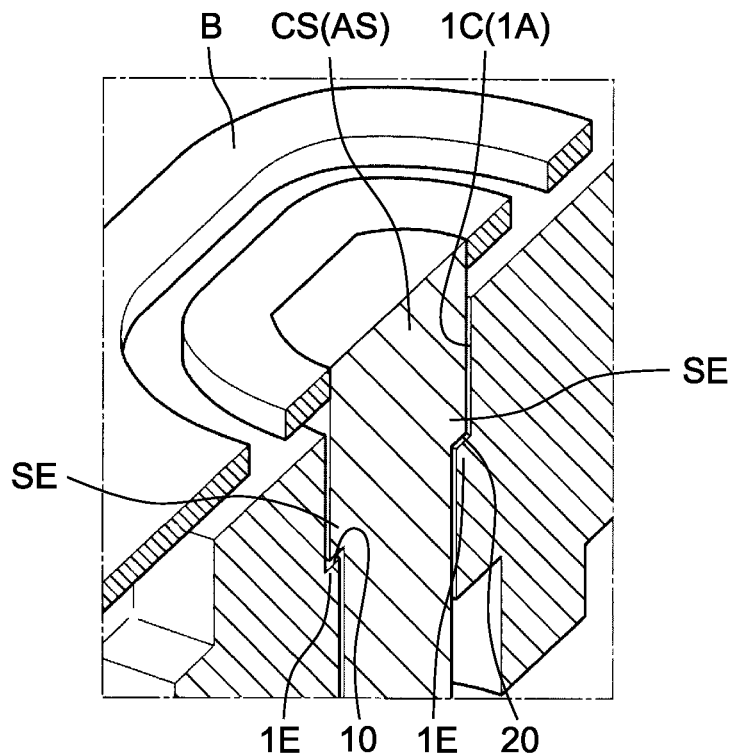
FIG. 4 is an enlarged view of a first perspective section of the feeder shaft of the electrolyzed water generator according to the exemplary embodiment.
Figure 5:
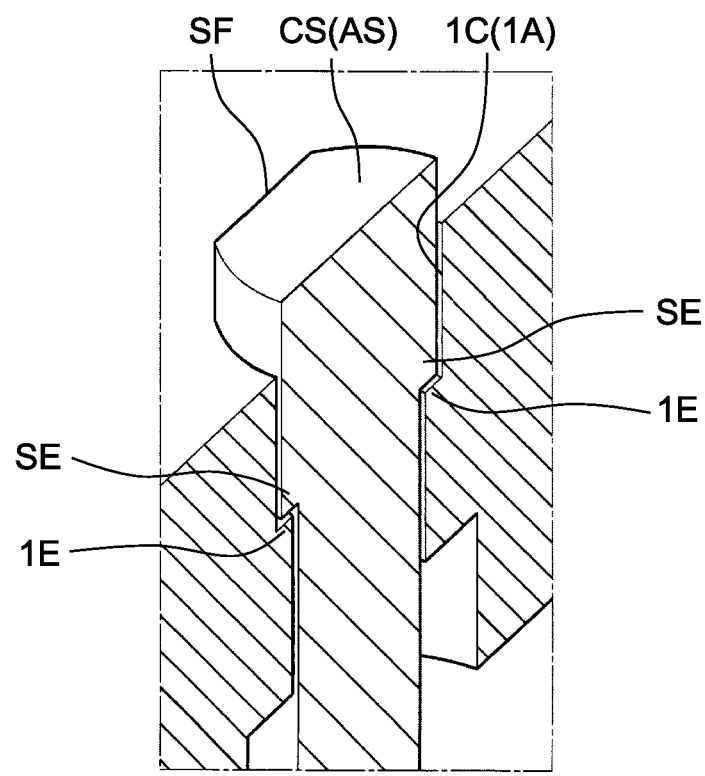
FIG. 5 is an enlarged view of a second perspective section of the feeder shaft of the electrolyzed water generator according to the exemplary embodiment.

As shown in FIGS. 3 to 5, electrolyzed water generator 100 includes two feeder shafts AS and CS that are electrically connected to anode A and cathode C, respectively, and that extend in a given direction to penetrate two through-holes 1A, 1C of housing 5, respectively. In other words, housing 5 is provided with two through-holes 1A, 1C. Feeder shaft AS is electrically connected to anode A and extends in the given direction to penetrate through-hole 1A. Feeder shaft CS is electrically connected to cathode C and extends in the given direction to penetrate through-hole 1C.

Each of feeder shafts AS, CS and each of through-holes 1A, 1C include engaging portion SE and engaged portion 1E, respectively, engaging portion SE and engaged portion 1E being engaged with each other to inhibit a positional shift of each of feeder shafts AS, CS against each of through-holes 1A, 1C in the given direction. In other words, each of feeder shafts AS, CS has engaging portion SE. Each of through-holes 1A, 1C has engaged portion 1E. Engaging portion SE and engaged portion 1E are engaged with each other to inhibit a positional shift of feeder shaft AS against through-hole 1A and a positional shift of feeder shaft CS against through-hole 1C in the given direction. In this configuration, a positional shift in the given direction, i.e., an axial direction, in which feeder shafts AS, CS extend, is inhibited.

As shown in FIGS. 3 to 5, engaging portion SE is a stepped projection formed such that a part of feeder shaft AS (CS) that is outside housing 5 is smaller in diameter than a part of feeder shaft AS (CS) that is inside housing 5. Specifically, each of feeder shaft AS and feeder shaft CS has a first shaft portion having a relatively large diameter and extending in the given direction, and a second shaft portion having a relatively smaller diameter than the diameter of the first shaft portion and extending in the given direction. The first shaft portion extends inwardly from the bottom of housing 5. The second shaft portion extends outwardly from the bottom of housing 5. Engaging portion SE is provided as the stepped projection between the first shaft portion and the second shaft portion.

Engaged portion 1E is a stepped through-hole formed such that a part of through-hole 1A (1C) that is outside housing 5 is smaller in diameter than a part of through-hole 1A (1C) that is inside housing 5. Specifically, each of through-hole 1A and through-hole 1C has a first through-hole portion having a relatively large diameter and extending in the given direction, and a second through-hole portion having a relatively smaller diameter than the diameter of the first through-hole portion and extending in the given direction. The first through-hole portion is located inwardly at the bottom of housing 5. The second through-hole portion is located outwardly at the bottom of housing 5. The stepped through-hole between the first through-hole portion and the second through-hole portion is provided as engaged portion 1E.

As shown in FIGS. 3 to 5, each of feeder shafts AS, CS and each of through-holes 1A, 1C include fitting portion SF and fitted portion 1F, respectively, fitting portion SF and fitted portion 1F being fitted together. In other words, each of feeder shafts AS, CS has fitting portion SF. Each of through-holes 1A, 1C has fitted portion 1F. These fitting portions SF and fitted portions 1F inhibit rotation of feeder shaft AS with respect to through-hole 1A around a rotation axis along the given direction and rotation of feeder shaft CS with respect to through-hole 1C around a rotation axis along the given direction. In short, the rotation of feeder shafts AS, CS around their respective rotation axes along the given direction is inhibited.

According to this exemplary embodiment, fitting portion SF is an external plane portion of each of feeder shafts AS, CS extending along the given direction. Fitted portion 1F is an internal plane portion of each of through-holes 1A, 1C extending along the given direction. Fitting portion SF and fitted portion 1F, therefore, can be formed easily. Fitting portion SF and fitted portion 1F may have any shape as long as fitting portion SF and fitted portion 1F are fitted together to inhibit feeder shaft AS and feeder shaft CS from rotating around their respective rotation axes along the given direction.

Electrolyzed water generator 100 includes spring B connecting anode A to feeder shaft AS and spring B connecting cathode C to feeder shaft CS. These springs B absorb a positional shift between anode A and feeder shaft AS for anode A and a positional shift between cathode C and feeder shaft CS for cathode C, respectively. Even if a load is applied to feeder shaft AS or CS, therefore, spring B absorbs a positional shift of feeder shaft AS or CS that is caused by the load. As a result, an adverse effect that the positional shift exerts on at least either anode main body AM or cathode C is suppressed.

As shown in FIGS. 3 to 5, spring B is a spiral spring swirling around a rotation axis along the given direction. This structure allows spring B to more effectively absorb a positional shift between anode A and feeder shaft AS for anode A and a positional shift between cathode C and feeder shaft CS for cathode C. As a result, an adverse effect that the positional shift exerts on at least either anode A or cathode C is suppressed effectively.

Figure 6:
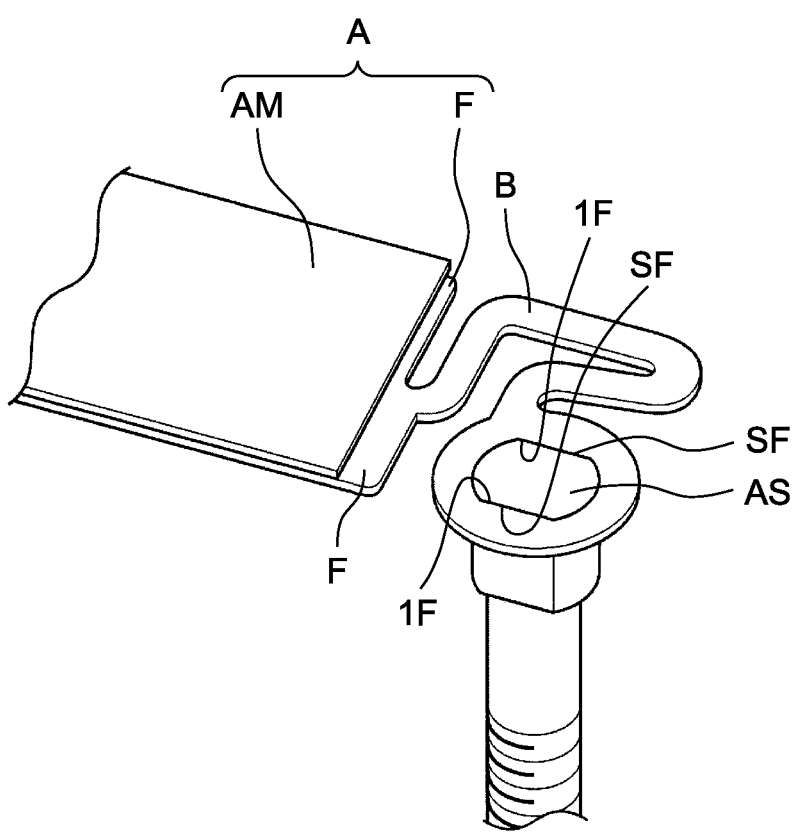
FIG. 6 is a partial perspective view showing another example of the positional relationship between the anode, the spring, and the feeder shaft of the electrolyzed water generator according to the exemplary embodiment.

Spring B may have any shape. For example, spring B may be of a shape shown in FIG. 6. According to this exemplary embodiment, two springs B are formed integrally with cathode C and anode A, respectively. However, spring B may be provided as a separately formed spring that is fixed to cathode C and to anode A.

An example of a configuration of lid 2 will be described next.

Figure 7:
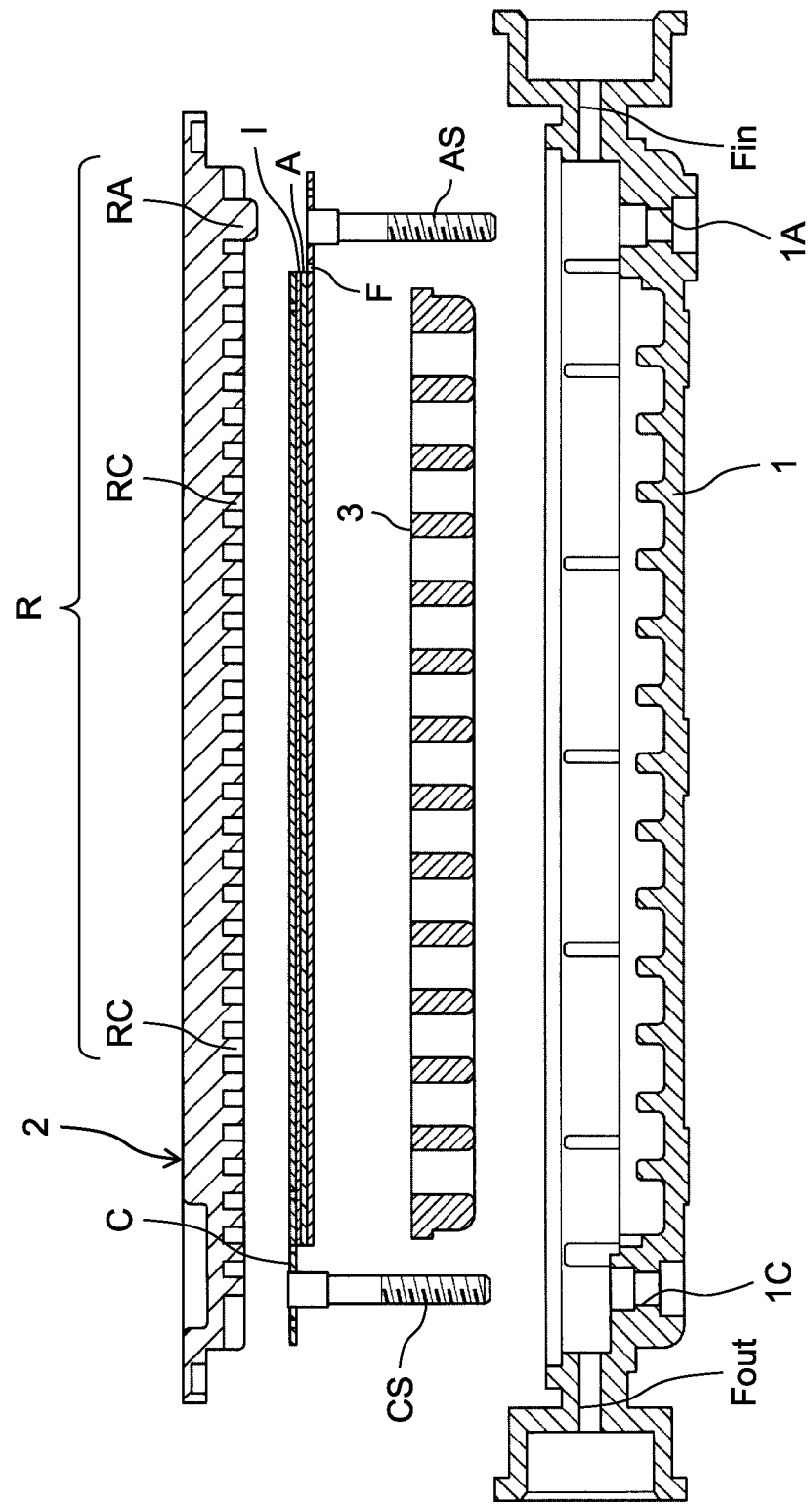
FIG. 7 is a vertical sectional view taken by cutting the electrolyzed water generator according to the exemplary embodiment along its length direction.

As shown in FIGS. 2 and 7, lid 2 includes holding projections R formed on the interior of lid 2 in such a way as to hold down stacked structure 4 in the stacking direction. In this structure, merely fixing lid 2 to container 1 inhibits a positional shift, deformation, or the like of feeder F, anode A, cation exchange membrane I, and cathode C that make up stacked structure 4.

Among three holding projections R shown in FIG. 2, two holding projections R formed on both sides in the width direction (Y direction) are projections extending linearly along the waterflow direction (X direction). Among three holding projections R shown in FIG. 2, one holding projection R formed at a center in the width direction is made up of holding protrusions RA, RC arranged along the waterflow direction, as shown in FIG. 7. In this structure, an extent to which holding projections R hamper waterflow inside electrolyzed water generator 100 is extremely small.

A lower end face of holding projection R at the center in FIG. 2 is located slightly higher than respective lower end faces of holding projections R on both sides in FIG. 2. Holding projection R at the center in FIG. 2 inhibits a central portion in the width direction of stacked structure 4 from rising in the stacking direction (Z direction) when holding projections R on both sides in FIG. 2 hold down stacked structure 4.

Specifically, holding projection R at the center in the width direction in FIG. 2 includes holding protrusion RA for anode A that holds down anode A and holding protrusions RC for cathode C that hold down cathode C, as shown in FIG. 7. This structure certainly inhibits a positional shift of cathode C and a positional shift of anode A. Specifically, holding protrusions RC for cathode C that are formed on one end in the lengthwise direction, as shown in FIG. 7, inhibit a positional shift in the axial direction of feeder shaft CS for cathode C. Holding protrusion RA for anode A shown in FIG. 7, on the other hand, inhibits a positional shift in the axial direction of feeder shaft AS for anode A.

According to this exemplary embodiment, holding projections R are rows of projections, e.g., three rows of projections. The structure of holding projections R is, however, not limited to this. Holding projections R may have any shape as long as holding projections R can inhibit the positional shift and deformation of anode A and cathode C.

An example of a configuration of housing 5 will be described next.

Housing 5 includes container 1 that holds feeder F, anode A, cathode C, and cation exchange membrane I, and lid 2 that closes the opening of container 1. Electrolyzed water generator 100 includes elastic material 3 placed between the bottom of container 1 and stacked structure 4 formed of feeder F, anode A, cathode C, and cation exchange membrane I.

Elastic material 3 is disposed in such a way as to be in contact with the bottom of container 1. Container 1 has a shape corresponding to a shape of elastic material 3. Stacked structure 4 is disposed such that stacked structure 4 comes into contact with an upper surface of elastic material 3.

Lid 2 is configured to hold down feeder F, anode A, cathode C, and cation exchange membrane I toward elastic material 3. Specifically, under lid 2, a protrusion protruding downward from lid 2 holds down an upper surface of cathode C. As a result, stacked structure 4 is pushed downward. At this time, elastic material 3, which is under stacked structure 4, absorbs a force applied by lid 2 to stacked structure 4.

In general, elastic material 3 deforms to bulge sideways when subjected to the force applied by lid 2 that pushes elastic material 3 downward from above via stacked structure 4. However, elastic material 3 according to this exemplary embodiment include hollows H that inhibit the deformation of elastic material 3 toward a side wall of container 1. When elastic material 3 is subjected to the force applied by lid 2 that pushes elastic material 3 downward from above via stacked structure 4, inner surfaces of hollows H, which are through-holes of elastic material 3, deform inwardly. This suppresses an adverse effect that the deformation of elastic material 3 exerts on the inner wall of container 1, that is, suppresses the deformation of and damage to container 1. It also suppresses an adverse effect that the deformation of elastic material 3 exerts on container 1, feeder F, anode A, cathode C, and cation exchange membrane I.

Hollows H are through-holes extending in a direction from lid 2 toward the bottom of container 1. These through-holes extend vertically in parallel with each other. This configuration allows hollows H to be formed easily. In place of hollows H, i.e., through-holes, recesses may be formed on the upper surface and the lower surface of elastic material 3 as long as the recesses inhibit the adverse effect that the deformation of elastic material 3 exerts on container 1 and stacked structure 4.

Elastic material 3 is of a substantially rectangular parallelepiped extending in a certain direction. The substantially rectangular parallelepiped mentioned here does not mean a mathematically defined exact rectangular parallelepiped. It is a shape that is considered to be parallelepipedic as a whole and is allowed to have a few irregularities.

Hollows H are arranged in a row along the lengthwise direction of the parallelepiped. Specifically, hollows H are formed so that elastic material 3 has a shape similar to a concrete block for construction work or to a latticed structure. Hollows H are provided as a row of the through-holes arranged along the waterflow direction.

Figure 8:
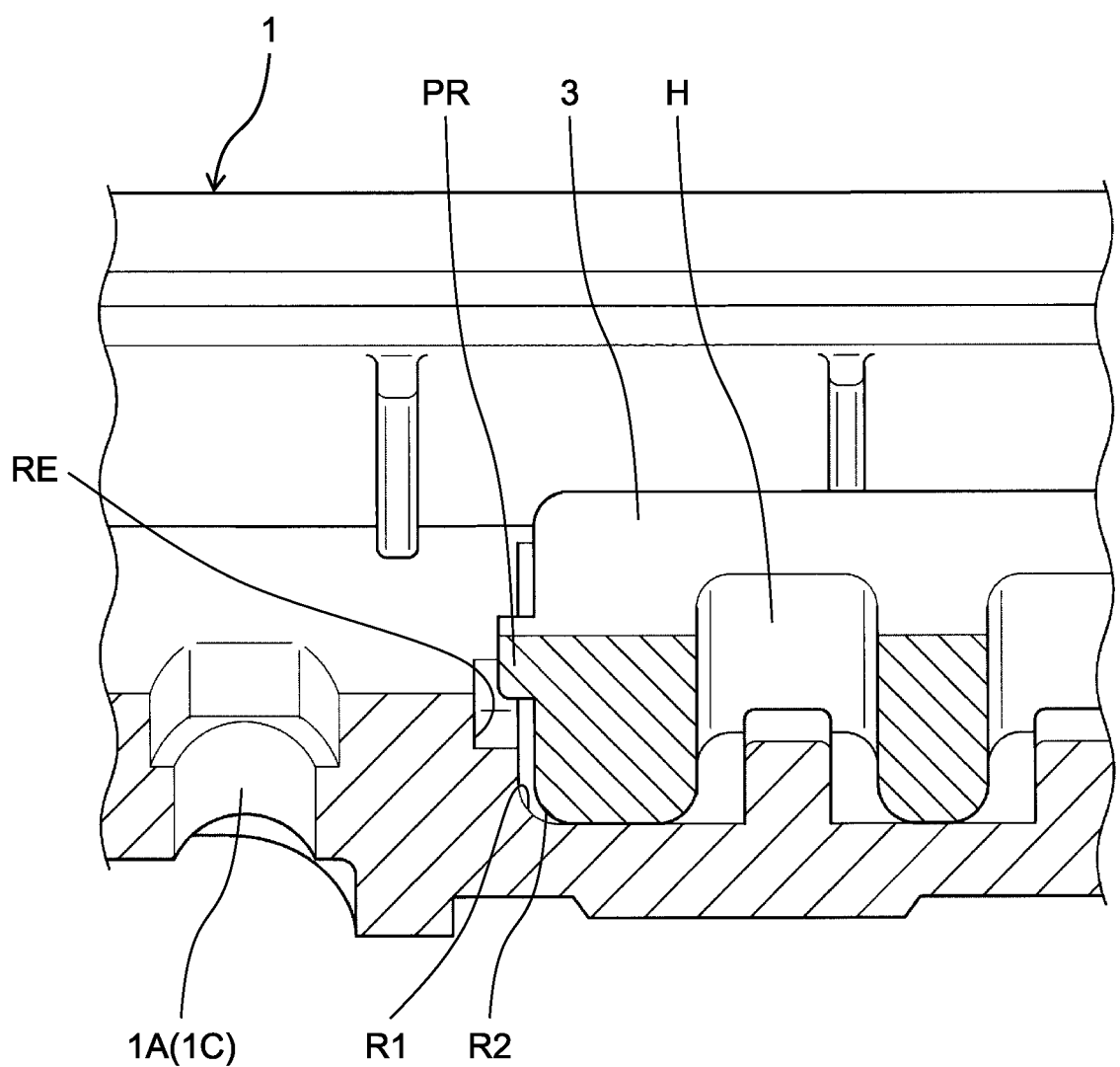
FIG. 8 is an enlarged perspective view of a structure that prevents insertion of an elastic material with its front and rear sides inverted, the structure being included in the electrolyzed water generator according to the exemplary embodiment.

As shown in FIGS. 2 and 8, container 1 includes arcuate corners R1 that connect the bottom of container 1 to inner side surfaces of container 1 to make the bottom and inner side surfaces continuous with each other. Elastic material 3 includes arcuate chamfered portions R2 that connect a lower surface of elastic material 3 to side surfaces of elastic material 3 to make the lower surface and side surfaces continuous with each other. Each arcuate chamfered portion R2 has a shape corresponding to a shape of each arcuate corner R1, that is, a shape fitted to each arcuate corner R1, and is stuck closely to each arcuate corner R1. As a result, elastic material 3 is stuck firmly and closely to container 1, that is, brought into full contact with container 1 and is fixed stably to container 1.

A surface of elastic material 3 that is closer to stacked structure 4 is a leveled flat surface. Elastic material 3 is thus stuck closely to a lower surface of stacked structure 4 to support stacked structure 4 stably.

Elastic material 3 includes elastic material fitting portions PR projecting outward respectively from both side faces in the lengthwise direction of elastic material 3. Container 1 includes two container fitted portions RE that receive two elastic material fitting portions PR, respectively. According to this exemplary embodiment, elastic material fitting portions PR are projections. Elastic material fitting portions PR, however, may be provided as recesses. Container fitted portions RE, on the other hand, are recesses, but may be provided as projections. Elastic material fitting portion PR and container fitted portion RE may have any shape as long as the shape allows elastic material fitting portion PR and container fitted portion RE to be fitted together.

In a view along the Z-axis direction, elastic material 3 has a shape that is mirror symmetric with respect to an axis along the X-axis direction and to an axis along the Y-axis direction. With respect to an axis along the Z-axis direction, however, elastic material 3 is not symmetric. Elastic material 3 is also mirror symmetric with respect to a virtual plane perpendicular to the waterflow direction. Because of this structure, each of two elastic material fitting portions PR of elastic material 3 can be fitted in either of two container fitted portions RE. This means that if elastic material 3 is disposed such that its lengthwise direction matches the waterflow direction, elastic material 3 can be fitted in container 1 properly, regardless of whether both ends of elastic material 3 in the lengthwise direction are on right and left sides or on left and right sides, respectively. Elastic material 3, therefore, can be fitted in container 1 easily.

If elastic material 3 with its front and rear sides inverted in the stacking direction is inserted in container 1, a gap is left between container 1 and elastic material 3. This may lead to deformation of elastic material 3, which makes the positions of anode A, cathode C, and cation exchange membrane I unstable. Elastic material fitting portion PR as well as container fitted portion RE, however, has a structure that prevents elastic material 3 with its front and rear sides inverted in the direction of stacking of anode A, cation exchange membrane I, and cathode C, that is, elastic material 3 set upside down in the vertical direction indicated in FIGS. 2 and 8, from being inserted into housing 5. Specifically, elastic material fitting portion PR is a projection that projects from a part of an upper end of the side face of elastic material 3. Container fitted portion RE, on the other hand, has the recess into which the projection, i.e., elastic material fitting portion PR is fitted. These structures easily prevent insertion of elastic material 3 set upside down in the vertical direction, that is, elastic material 3 with its front and rear sides inverted, into housing 5. As a result, a problem that arcuate corner R1 and arcuate chamfered portion R2 do not fit closely together because of insertion of elastic material 3 with its front and rear sides inverted in the stacking direction is easily prevented. Elastic material 3 is thus able to support stacked structure 4 stably.

Although electrolyzed water generator 100 according to this exemplary embodiment is the ozonized water generator that generates ozonized water, substances generated by electrolyzed water generator 100 are not limited to ozone. For example, electrolyzed water generator 100 may be an apparatus that generates hypochlorous acid to exert sterilizing effects. Electrolyzed water generator 100 may also be an apparatus that generates oxygen water, hydrogen water, chlorine-containing water, or hydrogen peroxide water.

Anode A of electrolyzed water generator 100 according to this exemplary embodiment may be made of any substance as long as anode A allows generation of electrolyzed water containing conductive silicon, conductive diamond, titanium, platinum, lead oxide, or tantalum oxide and has conductivity and durability. According to this exemplary embodiment, for example, anode main body AM is made of conductive diamond and feeder F is made of titanium. When anode A is a diamond electrode, a manufacturing method for anode A is not limited to a film deposition method and may be a manufacturing method using a non-metal material.

Cathode C is effective as long as it is an electrode combining conductivity and durability. It may be made of platinum, titanium, stainless steel, or conductive silicon.

Electrolyzed water generator 100 according to this exemplary embodiment can be used by being attached to an apparatus that can enhance concentration of electrolyzed water generated in an electrolyzed solution. For example, such apparatuses include water processing equipment, such as water purifiers, washing machines, dish washers, warm water washing toilet seats, refrigerators, water heaters/servers, sterilizers, medical instruments, air conditioners, and kitchen utensils.

Characteristic configurations of electrolyzed water generator 100 according to this exemplary embodiment and effects achieved by the characteristic configurations will hereinafter be described.

(1) Electrolyzed water generator 100 includes anode A, cathode C, and cation exchange membrane I provided between anode A and cathode C. Electrolyzed water generator 100 includes housing 5 having inlet Fin into which water flows and outlet Fout from which water flows out, housing 5 enclosing anode A, cathode C, and cation exchange membrane I and having first through-hole 1A and second through-hole 1C. Electrolyzed water generator 100 includes first feeder shaft AS electrically connected to anode A, first feeder shaft AS extending in the given direction to penetrate first through-hole 1A. Electrolyzed water generator 100 includes second feeder shaft CS electrically connected to cathode C, second feeder shaft CS extending in the given direction to penetrate second through-hole 1C. Each of first feeder shaft AS and second feeder shaft CS has engaging portion SE. Each of first through-hole 1A and second through-hole 1C has engaged portion 1E. Engaging portion SE and engaged portion 1E are engaged with each other to inhibit a positional shift of first feeder shaft AS against first through-hole 1A in the given direction and to inhibit a positional shift of second feeder shaft CS against second through-hole 1C in the given direction.

This configuration inhibits a positional shift between anode A, cathode C, and cation exchange membrane I in the given direction in which feeder shafts AS, CS extend.

(2) Each of first feeder shaft AS and second feeder shaft CS may have the first shaft portion having a relatively large diameter and extending in the given direction, and the second shaft portion having a relatively smaller diameter than the relatively large diameter of the first shaft portion and extending in the given direction. The stepped projection between the first shaft portion and the second shaft portion may be provided as engaging portion SE. Each of first through-hole 1A and second through-hole 1C may have the first through-hole portion having a relatively large diameter and extending in the given direction, and the second through-hole portion having a relatively smaller diameter than the relatively large diameter of the first through-hole portion and extending in the given direction. The stepped through-hole between the first through-hole portion and the second through-hole portion may be provided as engaged portion 1E.

According to this configuration, feeder shafts AS, CS and through-holes 1A, 1C can be formed easily.

(3) Electrolyzed water generator 100 includes anode A, cathode C, and cation exchange membrane I provided between anode A and cathode C. Electrolyzed water generator 100 includes housing 5 having inlet Fin into which water flows and outlet Fout from which water flows out, housing 5 enclosing anode A, cathode C, and cation exchange membrane I and having first through-hole 1A and second through-hole 1C. Electrolyzed water generator 100 includes first feeder shaft AS electrically connected to anode A, first feeder shaft AS extending in the given direction to penetrate first through-hole 1A. Electrolyzed water generator 100 includes second feeder shaft CS electrically connected to cathode C, second feeder shaft CS extending in the given direction to penetrate second through-hole 1C. Each of first feeder shaft AS and second feeder shaft CS has fitting portion SF. Each of first through-hole 1A and second through-hole 1C has fitted portion 1F. Fitting portion SF and fitted portion 1F are fitted together to inhibit the rotation of first feeder shaft AS with respect to first through-hole 1A around the rotation axis along the given direction and the rotation of second feeder shaft CS with respect to second through-hole 1C around the rotation axis along the given direction.

This configuration inhibits a positional shift of anode A, cathode C, and cation exchange membrane I in the direction of rotation around the rotation axis along the given direction in which feeder shafts AS, CS extend, that is, inhibits rotation of anode A, cathode C, and cation exchange membrane I around the rotation axis along the given direction.

(4) Fitting portion SF may be the external plane portion of each of first feeder shaft AS and second feeder shaft CS that extend along the given direction. Fitted portion 1F may be the internal plane portion of each of first through-hole 1A and second through-hole 1C that extend along the given direction.

According to this configuration, fitting portion SF and fitted portion 1F can be formed easily.

(5) Electrolyzed water generator 100 includes anode A, cathode C, and cation exchange membrane I provided between anode A and cathode C. Electrolyzed water generator 100 includes housing 5 having inlet Fin into which water flows and outlet Fout from which water flows out, housing 5 enclosing anode A, cathode C, and cation exchange membrane I and having first through-hole 1A and second through-hole 1C. Electrolyzed water generator 100 includes first feeder shaft AS electrically connected to anode A, first feeder shaft AS extending in the given direction to penetrate first through-hole 1A. Electrolyzed water generator 100 includes second feeder shaft CS electrically connected to cathode C, second feeder shaft CS extending in the given direction to penetrate second through-hole 1C. Electrolyzed water generator 100 includes first spring B connecting anode A to first feeder shaft AS and second spring B connecting cathode C to second feeder shaft CS.

According to this configuration, even if a load is applied to feeder shaft AS or CS, spring B absorbs a positional shift of feeder shaft AS or CS that is caused by the load. As a result, an adverse effect that the positional shift exerts on at least either anode A or cathode C is suppressed.

(6) Each of first spring B and second spring B may be a spiral spring swirling around the rotation axis along the given direction.

According to this configuration, an adverse effect that the positional shift exerts on at least either anode A or cathode C is suppressed more effectively.

(7) Electrolyzed water generator 100 includes anode A, cathode C, and cation exchange membrane I provided between anode A and cathode C. Electrolyzed water generator 100 includes housing 5 having inlet Fin into which water flows and outlet Fout from which water flows out, housing 5 enclosing anode A, cathode C, and cation exchange membrane I. Housing 5 includes positioning fitting portions T fitted on external fitted portions P.

According to this configuration, electrolyzed water generator 100 can be positioned easily with respect to external apparatus 200. Electrolyzed water generator 100, therefore, can be used in a more preferable manner.

(8) Housing 5 may include container 1 that holds anode A, cathode C, and cation exchange membrane I, and lid 2 that closes the opening of container 1. Positioning fitting portions T may be formed on lid 2.

According to this configuration, container 1 having positioning fitting portions T can be formed as a decrease in the strength of the container 1 caused by positioning fitting portions T is suppressed.

(9) Lid 2 may include thin-walled portion 21 having a relatively small wall thickness and thick-walled portion 22 having a relatively large wall thickness. Positioning fitting portions T may be formed on thick-walled portion 22.

According to this configuration, a decrease in the strength of lid 2 is suppressed.

(10) Positioning fitting portions T may be the grooves extending along the lengthwise direction of lid 2.

According to this configuration, electrolyzed water generator 100 can be positioned stably with respect to external fitted portions P.

(11) Electrolyzed water generator 100 includes anode A, cathode C, and cation exchange membrane I provided between anode A and cathode C. Electrolyzed water generator 100 includes housing 5 having inlet Fin into which water flows and outlet Fout from which water flows out, housing 5 enclosing anode A, cathode C, and cation exchange membrane I. Housing 5 includes container 1 that holds anode A, cathode C, and cation exchange membrane I, and lid 2 that closes the opening of container 1. Lid 2 includes the laser-transmitting resin having the color that relatively easily allows transmission of laser light. Container 1 includes the laser-absorbing resin having the color that relatively easily allows absorption of laser light. Lid 2 and container 1 are fixed together by welding their resin components by laser light.

According to this configuration, lid 2 and container 1 are fixed together easily.

(12) Lid 2 may include thin-walled portion 21 having a relatively small wall thickness and thick-walled portion 22 having a relatively large wall thickness. Container 1 may include container projection 11 projecting toward thin-walled portion 21 of lid 2. Thin-walled portion 21 and container projection 11 may be fixed together by welding their resin components by laser light.

According to this configuration, lid 2 and container 1 are fixed together firmly.

(13) Electrolyzed water generator 100 includes anode A, cathode C, and cation exchange membrane I provided between anode A and cathode C. Electrolyzed water generator 100 includes housing 5 having inlet Fin into which water flows and outlet Fout from which water flows out, housing 5 enclosing anode A, cathode C, and cation exchange membrane I. Housing 5 includes container 1 that holds anode A, cathode C, and cation exchange membrane I, and lid 2 that closes the opening of container 1. Anode A, cation exchange membrane I, and cathode C jointly make up stacked structure 4. Lid 2 includes holding projections R formed on the interior of lid 2 in such a way as to hold down stacked structure 4 in the stacking direction.

According to this configuration, merely fixing lid 2 to container 1 inhibits a positional shift between anode A, cation exchange membrane I, and cathode C that make up stacked structure 4.

(14) Holding projection R may be a projection extending along the waterflow direction or may be made up of a plurality of holding protrusions RA, RC arranged along the waterflow direction.

According to this configuration, the extent to which holding projections R hamper waterflow inside electrolyzed water generator 100 becomes extremely small.

(15) Holding projection R may include holding protrusion RA for anode A that holds down anode A and holding protrusions RC for cathode C that hold down cathode C.

According to this configuration, a positional shift of cathode C and that of anode A are inhibited more certainly.

(16) Electrolyzed water generator 100 includes anode A, cathode C, and cation exchange membrane I provided between anode A and cathode C. Electrolyzed water generator 100 includes housing 5 having inlet Fin into which water flows and outlet Fout from which water flows out, housing 5 enclosing anode A, cathode C, and cation exchange membrane I. Housing 5 includes container 1 that holds anode A, cathode C, and cation exchange membrane I, and lid 2 that closes the opening of container 1. Electrolyzed water generator 100 further includes elastic material 3 placed between the bottom of container 1 and anode A, cathode C, and cation exchange membrane I. Lid 2 is configured to hold down anode A, cathode C, and cation exchange membrane I toward elastic material 3. Elastic material 3 include hollows H that inhibit the deformation of elastic material 3 toward the side wall of container 1.

According to this configuration, an adverse effect that the deformation of elastic material 3 exerts on anode A, cathode C, and cation exchange membrane I is suppressed.

(17) Hollows H may be through-holes extending in the direction from lid 2 toward the bottom of container 1.

According to this configuration, hollows H are formed easily.

(18) Elastic material 3 may be of a substantially rectangular parallelepiped extending in a certain direction. Hollows H may be arranged in a row along the lengthwise direction of the substantially parallelepiped.

According to this configuration, the through-holes can be arranged in a row along the waterflow direction.

(19) Electrolyzed water generator 100 includes anode A, cathode C, and cation exchange membrane I provided between anode A and cathode C. Electrolyzed water generator 100 includes housing 5 having inlet Fin into which water flows and outlet Fout from which water flows out, housing 5 enclosing anode A, cathode C, and cation exchange membrane I. Housing 5 includes container 1 that holds anode A, cathode C, and cation exchange membrane I, and lid 2 that closes the opening of container 1. Electrolyzed water generator 100 further includes elastic material 3 placed between the bottom of container 1 and anode A, cathode C, and cation exchange membrane I. Container 1 includes arcuate corners R1 that connect the bottom of container 1 to the inner side surface of container 1 to make the bottom and inner side surface continuous with each other. Elastic material 3 includes arcuate chamfered portions R2 that connect the lower surface of elastic material 3 to the side surface of elastic material 3 to make the lower surface and side surface continuous with each other and that are stuck closely to arcuate corners R1. Container 1 includes container fitted portions RE formed on the inner side surface of container 1. Elastic material 3 includes elastic material fitting portions PR formed on side faces of elastic material 3, elastic material fitting portions PR being fitted into container fitted portions RE. Elastic material fitting portions PR and container fitted portions RE make up the structure that prevents elastic material 3 with its front and rear sides inverted in the direction of stacking of anode A, cation exchange membrane I, and cathode C from being inserted into housing 5.

According to this configuration, elastic material 3 with its front and rear sides inverted in the direction of stacking of anode A, cation exchange membrane I, and cathode C is easily prevented from being inserted into housing 5.

(20) Elastic material 3 may be mirror symmetric with respect to a virtual plane perpendicular to the waterflow direction.

According to this configuration, if elastic material 3 is disposed in such a way as to extend along the waterflow direction, elastic material 3 can be fitted in container 1 properly, regardless of whether both ends of elastic material 3 are on right and left sides or on left and right sides, respectively. As a result, elastic material 3 can be fitted in container 1 easily.

What is claimed is:

1. An electrolyzed water generator comprising:
an anode;
a cathode;
a cation exchange membrane provided between the anode and the cathode; and
a housing having an inlet into which water flows and an outlet from which water flows out, the housing enclosing the anode, the cathode, and the cation exchange membrane,
wherein the housing includes a positioning fitting portion fitted on an external fitted portion,
the housing includes:
a container that holds the anode, the cathode, and the cation exchange membrane; and
a lid that closes an opening of the container,
the positioning fitting portion is formed on the lid,
the positioning fitting portion comprises a bottom surface and an opening which is opposite to the bottom surface,
the bottom surface of the positioning fitting portion is closer to the container than the opening of the positioning fitting portion, and
the external fitted portion is a portion of an external apparatus relative to the electrolyzed water generator.

2. The electrolyzed water generator according to claim 1, wherein
the lid includes:
a thin-walled portion; and
a thick-walled portion having a larger wall thickness than the thin-walled portion, and
the positioning fitting portion is formed on the thick-walled portion.

3. The electrolyzed water generator according to claim 1, wherein the positioning fitting portion is a groove extending along a lengthwise direction of the lid.

4. The electrolyzed water generator according to claim 1, wherein
the lid includes a laser-transmitting resin having a color that allows transmission of laser light,
the container includes a laser-absorbing resin having a color that allows absorption of laser light, and
the lid and the container are fixed together by welding resin components by laser light.

5. The electrolyzed water generator according to claim 4, wherein
the lid includes: a thin-walled portion; and a thick-walled portion having a larger wall thickness than the thin-walled portion,
the container includes a container projection projecting toward the thin-walled portion of the lid, and
the thin-walled portion and the container projection are fixed together by welding resin components by laser light.

6. The electrolyzed water generator according to claim 1, wherein
the anode, the cation exchange membrane, and the cathode jointly make up a stacked structure, and
the lid includes a holding projection formed on an interior of the lid to hold down the stacked structure in a stacking direction.

7. The electrolyzed water generator according to claim 6, wherein
the holding projection is a projection extending along the waterflow direction or a plurality of holding protrusions arranged along the waterflow direction.

8. The electrolyzed water generator according to claim 6, wherein
the holding projection includes a holding protrusion for anode that holds down the anode, and a holding protrusion for cathode that holds down the cathode.

9. The electrolyzed water generator according to claim 1, wherein
the external fitted portion is disposed on a top surface of the lid.

10. The electrolyzed water generator according to claim 1, wherein
the anode, the cation exchange membrane, and the cathode are stacked along a stacking direction, and
the container and the lid are disposed along the stacking direction.

* * * * *